United States Patent
Veshchikov et al.

(10) Patent No.: US 11,270,227 B2
(45) Date of Patent: Mar. 8, 2022

(54) METHOD FOR MANAGING A MACHINE LEARNING MODEL

(71) Applicant: NXP B.V., Eindhoven (NL)

(72) Inventors: Nikita Veshchikov, Brussels (BE); Joppe Willem Bos, Wijgmaal (BE); Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 777 days.

(21) Appl. No.: 16/148,502

(22) Filed: Oct. 1, 2018

(65) Prior Publication Data

US 2020/0104754 A1 Apr. 2, 2020

(51) Int. Cl.
*G06N 20/00* (2019.01)
*G06F 16/22* (2019.01)

(52) U.S. Cl.
CPC ............. *G06N 20/00* (2019.01); *G06F 16/22* (2019.01)

(58) Field of Classification Search
CPC ................................ G06N 20/00; G06F 16/22
See application file for complete search history.

(56) References Cited

U.S. PATENT DOCUMENTS

| | | | |
|---|---|---|---|
| 8,250,009 B1 * | 8/2012 | Breckenridge | ........ G06N 20/00 706/14 |
| 9,349,105 B2 | 5/2016 | Beymer et al. | |
| 9,934,363 B1 | 4/2018 | Hwang et al. | |
| 10,459,444 B1 * | 10/2019 | Kentley-Klay | ...... G05D 1/0027 |
| 2003/0237090 A1 | 12/2003 | Boston et al. | |
| 2011/0320767 A1 * | 12/2011 | Eren | ....................... G06N 20/00 712/30 |
| 2016/0078361 A1 * | 3/2016 | Brueckner | .............. H04L 67/10 706/12 |
| 2016/0307099 A1 * | 10/2016 | Lin | ......................... G06N 20/00 |
| 2016/0358099 A1 * | 12/2016 | Sturlaugson | ........... G06N 5/043 |
| 2017/0109646 A1 * | 4/2017 | David | ..................... H01L 22/12 |
| 2017/0286622 A1 | 10/2017 | Cox et al. | |

(Continued)

FOREIGN PATENT DOCUMENTS

JP 2017049677 A 3/2017

OTHER PUBLICATIONS

Burt, Andrew; "How Will the GDPR Impact Machine Learning?" May 16, 2018, Data Science; https://www.oreilly.com/ideas/how-will-the-gdpr-impact-machine-learning.

(Continued)

*Primary Examiner* — Beau D Spratt
(74) *Attorney, Agent, or Firm* — Daniel D. Hill

(57) ABSTRACT

A method is provided for managing a machine learning system. In the method, a database is provided for storing a plurality of data elements. A plurality of machine learning models is trained using assigned subsets of the plurality of data elements. The outputs of the plurality of machine learning models is provided to an aggregator. During inference operation of the machine learning system, the aggregator determines a final output based on outputs from the plurality of models. If it is determined that an assigned subset must be changed because, for example, a record must be deleted, then the data element is removed from the selected assigned subset. The affected machine learning model associated with the changed assigned subset is removed, and retrained using the changed assigned subset.

20 Claims, 3 Drawing Sheets

(56) References Cited

U.S. PATENT DOCUMENTS

2018/0089592 A1\* 3/2018 Zeiler .................. G06F 16/212
2018/0114332 A1 4/2018 Desai et al.

OTHER PUBLICATIONS

Dzeroski, Saso, et al.; "Is Combining Classifiers With Stacking Better Than Selecting the Best One?" Machine Learning, Proceedings of the Nineteenth International Conference (ICML 2002), University of New South Wales, Sydney, Australia, Jul. 8-12, 2002.
Fredrikson, Matt, et al.; "Model Inversion Attacks That Exploit Confidence Information and Basic Countermeasures;" CCS '15 Proceedings of the 22nd ACM SIGSAC Conference on Computer and Communications Security; Denver, Colorado, USA—Oct. 12-16, 2015.
Papernot, Nicolas, et al.; "Practical Black-Box Attacks Against Machine Learning;" ASIA CCS '17 Proceedings of the 2017 ACM on Asia Conference on Computer and Communications Security, Abu Dhabi, United Arab Emirates—Apr. 2-6, 2017; DOI: http://dx.doi.org/10.1145/3052973.3053009.
Shokri, Reza, et al.; "Membership Inference Attacks Against Machine Learning Models;" Published in: 2017 IEEE Symposium on Security and Privacy (SP); May 22-26, 2017; DOI: 10.1109/SP.2017.41.
Szegedy, Christian, et al.; "Intriguing Properties of Neural Networks;" arXiv:1312.6199v4 [cs.CV]; Feb. 19, 2014.
Lomas, Natasha; "Machine Learning Used to Predict Fine Wine Price Moves"; Tech Crunch; Aug. 5, 2015; From Internet: https://techcrunch.com/2015/08/05/machine-learning-used-to-predict-fine-wine-price-moves/?guccounter=1.

\* cited by examiner

METHOD FOR MANAGING A MACHINE LEARNING MODEL

BACKGROUND

Field

This disclosure relates generally to machine learning, and more particularly, to a method for managing a machine learning model.

Related Art

Machine learning is becoming more widely used in many of today's applications, such as applications involving forecasting and classification. Generally, a machine learning algorithm is trained, at least partly, before it is used. Training data is used for training a machine learning algorithm. The effectiveness of the machine learning model is influenced by its accuracy, execution time, storage requirements, and the quality of the training data. The expertise, time, and expense required for compiling a representative training set of data, labelling the data results in the training data, and the machine learning model obtained from the training data are valuable assets that need to be protected from cloning attacks.

A machine learning system may include a plurality of machine learning models to perform computations. In a machine learning system that uses a plurality of machine learning models, the outputs of each of the machine learning models are connected to an aggregator that computes a final output. Using a plurality of machine learning models allows different machine learning algorithms to be used together, potentially improving accuracy and for making the system more resistant to cloning attacks. The plurality of machine learning models together functions as a single model and may provide better results than the use of a single model alone. However, combining multiple models as described adds complexity which makes adding and deleting items from the training data used to train the models more difficult.

Therefore, a need exists for a way to change the training data in a machine learning system having a plurality of machine learning models that allows the training data to be changed more easily while still being resistant to attacks.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
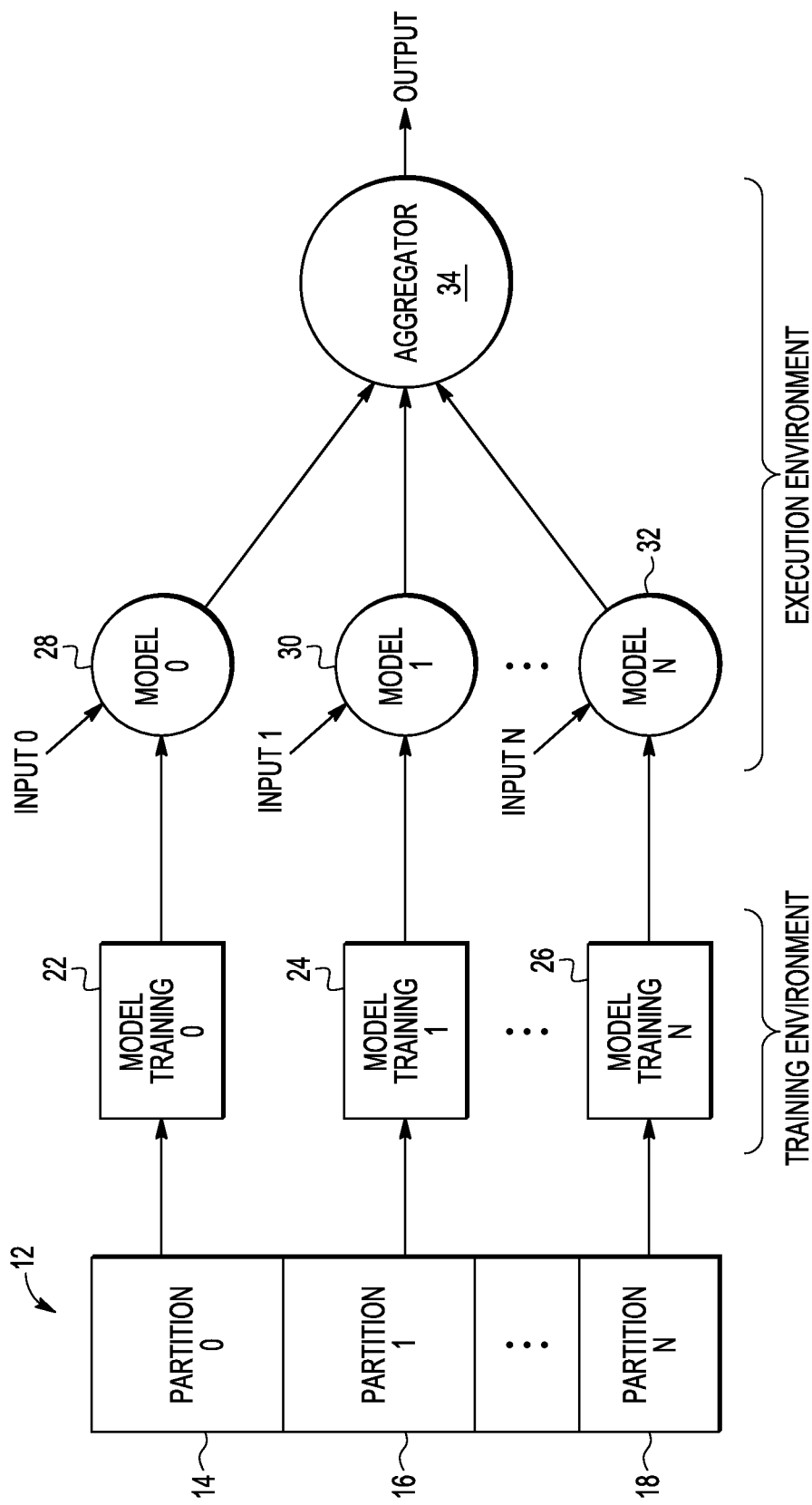
FIG. 1 illustrates a conceptual diagram of a machine learning system in accordance with an embodiment.

Generally, there is provided, a method for managing a machine learning system. The machine learning system includes a database and a plurality of machine learning models. A plurality of data elements in the database are used to train the plurality of machine learning models during a training phase of operation. The plurality of data elements is arranged in subsets of data elements where each subset is assigned to one of the plurality of machine learning models. From time-to-time, an assigned subset may have to be changed by removing a data element from a selected assigned subset in the database or by adding a new data element to a selected assigned subset in the database. When an assigned subset is changed, in addition to changing the database, the associated machine learning model that was trained using the assigned subset is not used for computations during the inference phase of operation in the machine learning system. Instead, a new machine learning model is trained using the changed assigned subset to replace the machine learning model that was removed from service. The machine learning system continues to perform inference operations without the removed machine learning model while the new machine learning model is trained.

When a data element is removed from the database, removing the machine learning model associated with the removed data element ensures that no information related to the removed data element remains in the database. Also, by removing only the affected machine learning model, the rest of the plurality of machine learning models are available to continue to provide computations during inference phase operation. The method allows for the complete removal of a confidential record that may include sensitive personal information or sensitive corporate information, while still allowing the machine learning system to be used for inference computations.

In accordance with an embodiment, there is provided, a method including: providing a database for storing a plurality of data elements; training a plurality of machine learning models, each of the machine learning models being trained using assigned subsets of the plurality of data elements; coupling outputs of the plurality of machine learning models to an aggregator, wherein the aggregator is for determining a final output during inference operation of the machine learning system; selecting an assigned subset to be changed; changing the selected assigned subset by removing a data element from the selected assigned subset or by adding a new data element to the selected subset; removing the machine learning model associated with the changed assigned subset; and training a new machine learning model to replace the removed machine learning model using the changed assigned subset. Each machine learning model of the plurality of machine learning models may use a different machine learning algorithm. Each machine learning model of the plurality of machine learning models may use the same machine learning algorithm but with different parameters. The assigned subsets of the plurality of records may overlap with each other so that records in the overlapping portions are input to more than one of the plurality of machine learning models. The aggregator may determine the final output by choosing a most commonly provided output from the plurality of machine learning models. Selecting an assigned subset to be changed may further include selecting one of the plurality of data elements to be removed from the assigned subset. The plurality of data elements may include a plurality of confidential records. The aggregator may be a plurality of selectable aggregators, each of the plurality of selectable aggregators may be different from the other selectable aggregators.

In another embodiment, there is provided, a method including: providing a database for storing a plurality of data elements; training a plurality of machine learning models, each of the machine learning models being trained using assigned subsets of the plurality of data elements; coupling outputs of the trained plurality of machine learning models to an aggregator, wherein the aggregator is for determining a final output during inference operation of the machine learning system; selecting a data element of the plurality of data elements to be removed; determining the assigned subset to which the selected data element belongs; removing the selected data element from the assigned subset producing a changed assigned subset; removing the machine learning model associated with the assigned subset that included the removed data element; and training a new machine learning model to replace the removed machine learning model using the changed assigned subset. Each machine learning model of the plurality of machine learning models may use a different machine learning algorithm. Each machine learning model of the plurality of machine learning models may use the same machine learning algorithm but with different parameters. The assigned subsets of the plurality of records may overlap with each other so that records in the overlapping portions are input to more than one of the plurality of machine learning models. The aggregator may determine the final output by choosing a most commonly provided output from the plurality of machine learning models. Selecting an assigned subset to be changed may further include selecting one of the plurality of data elements to be removed from the assigned subset. The plurality of data elements may include a plurality of confidential records. The aggregator may be a plurality of selectable aggregators, each of the plurality of selectable aggregators being different from the other selectable aggregators.

In yet another embodiment, there is provided, a method including: providing a database for storing a plurality of data elements; assigning the plurality of data elements to subsets of data elements; training a plurality of machine learning models, each of the machine learning models being trained using one of the assigned subsets to produce a trained plurality of machine learning models; coupling outputs of the trained plurality of machine learning models to an aggregator, wherein the aggregator is for determining a final output during inference operation of the machine learning system; determining that a data element of the plurality of data elements must be deleted; determining the assigned subset to which the selected data element belongs; determining the machine learning model that was trained by the assigned subset to which the selected data element belongs; removing the selected data element from the assigned subset producing a changed assigned subset; removing the machine learning model that was trained with the assigned subset so that the removed machine learning model no longer provides an output during the inference operation; and training a new machine learning model to replace the removed machine learning model using the changed assigned subset. Each machine learning model of the plurality of machine learning models may use a different machine learning algorithm. Each machine learning model of the plurality of machine learning models may use the same machine learning algorithm but with different parameters. The assigned subsets of the plurality of records may overlap with each other so that records in the overlapping portions are input to more than one of the plurality of machine learning models.

FIG. 1 illustrates a conceptual diagram of a machine learning system 10 in accordance with an embodiment. In FIG. 1, a plurality of data partitions 12 represented by partitions 14, 16, and 18 are connected to a training environment for providing training data to a plurality of model training portions represented by model training portions 22, 24, and 26. In the illustrated embodiment, a number N+1 of model training portions is equal to the number of models to be trained as well as the number of data partitions. The data partitions 12 may be stored in a memory of a data processing system, such as one or both of memories 46 and 50 of data processing system 10 in FIG. 2. The training environment includes resources for training a machine learning model with training data received from the plurality of data partitions 12. Each of the model training portions is coupled to receive an assigned subset of training data. For example, model training portion 22 is coupled to receive the training data from partition 14, model training portion 24 is coupled to receive training data from partition 16, and model training portion 26 is coupled to receive training data from partition 20. In another embodiment, the assigned subsets may overlap so that a data element may be assigned to more than one subset. The training environment includes a machine learning algorithm that can be applied to the training data to produce a trained machine learning model during a training phase. During the training phase of operation, model training portions 22, 24, and 26 use the assigned subsets of training data to train each of models 28, 30, and 32 with the associated assigned subset. For example, model 28 is trained by model training portion 22 using a machine learning algorithm and training data. After the training phase is complete, an inference or prediction operating phase is executed in the execution environment. The execution environment includes trained machine learning models 28, 30, and 32, and aggregator 34, and may be used for computations to analyze and evaluate input data to produce an output. The inference phase input data is labeled "INPUT 0", "INPUT 1", and "INPUT N" in FIG. 1. In the illustrated embodiment, models 28, 30, and 32 differ from each other in some way. For example, the models may differ, in part, because they may each have been trained using different training data. Also, the models may differ because their machine learning algorithms may be different. Furthermore, the machine learning algorithms may be different types of machine learning algorithms, such as a combination of neural networks and support vector machine algorithms. Also, the machine learning algorithms may be the same algorithm type but with different parameters. The differences between the models can be minor.

One purpose for partitioning the data in the illustrated embodiment is to produce subsets of records from the database that are then input to the model training portions during the training phase of operation. The subsets of data elements should be created using a method that can recreate the same subsets later, if necessary, such as when a data element in a subset needs to be deleted, or when a data element needs to be added to a subset. There are various methods available for partitioning a training database into sets of data elements or records. One example of partitioning assigns a sequence of unique identifiers (IDs) to identify each record or data element. Then, a partition may include a range of unique IDs, for example, unique IDs 0-99 may form one subset of training data. Another way to partition data may be to use steps, or offsets, to assign records to the model training portions. For example, where the unique IDs are in a sequence of numbers, a step interval of 3 may result in unique IDs 0, 3, 6, 9, 12, etc. being one subset, another subset may include unique IDs 1, 4, 7, 10, 13, etc., and another subset may include 2, 5, 8, 11, 14, etc. In another embodiment, the subsets may be chosen randomly from a sequence or series of unique IDs. Alternately, a hash function may be used for assigning data elements from the training database to assigned subsets. In this example, a hash is computed from a unique ID to produce a value. All records having the same value would be assigned to the same subset. If the hash produces an output that is too big for the number of records, then the size of the hash may be restricted, by e.g., truncating bits. New records would be assigned by computing the hash of the unique ID. Note that the hash function does not have to be cryptographically secure for this purpose. A unique ID can be assigned to more than one subset by, for example, using several hash functions or by using a different part of the hash output. There are other ways to assign records to a subset.

As mentioned above, the inference phase of operation can be entered after the training phase of machine learning system 10 is complete. In the execution environment, an input to be analyzed is provided to the plurality of models and an output is computed. There are various ways the output may be computed by the plurality of models. In one embodiment, all the plurality of models receives the input and are used in the computation. In another embodiment, a fixed subset of one or more of the plurality of models is used and the unused models are reserved as backup models to be used if one of the models needs to be replaced. Alternately, the subset of models may be rotated through the plurality of models based on a predetermined scheme.

Figure 3:
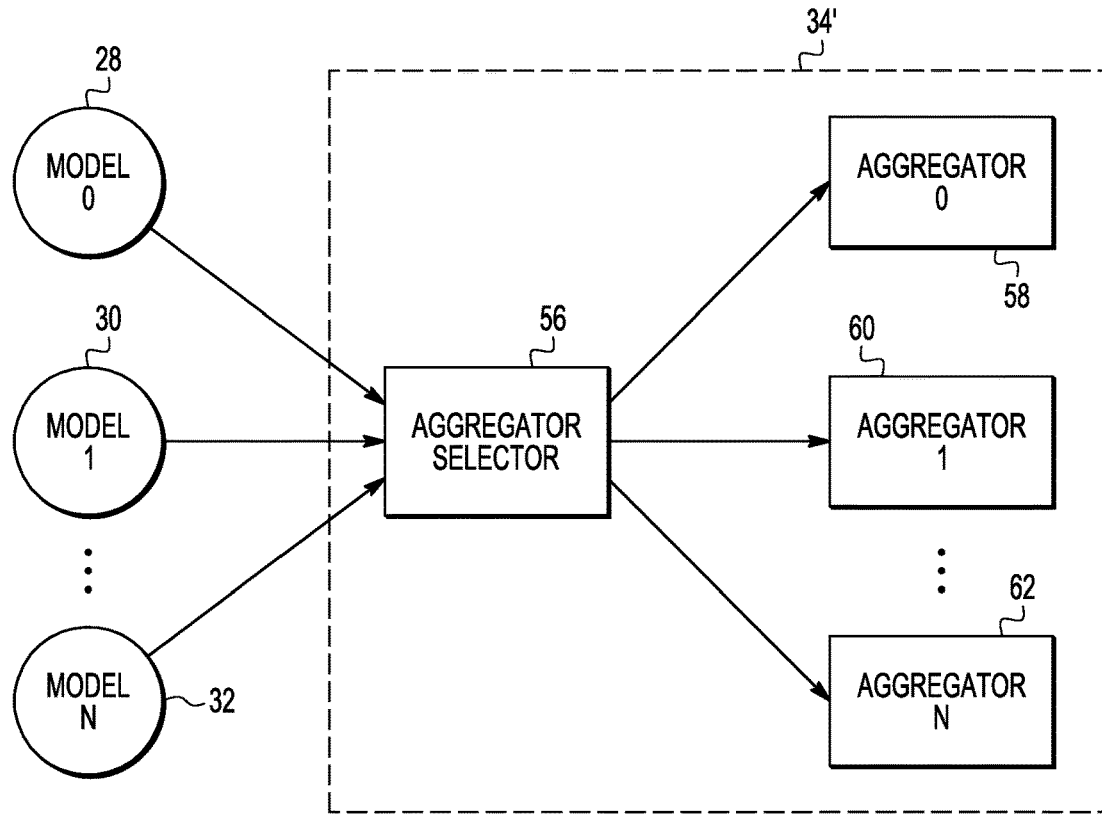
FIG. 3 illustrates another embodiment of the aggregator of the machine learning system of FIG. 1.

The selected outputs of the plurality of models are provided to aggregator 34, which provides a final output based on a predetermined algorithm. Aggregator 34 may be implemented in various ways. For example, one way to determine the final output when more than one of the plurality of models is selected to output a result is to select the result that is most commonly output. Another way for the aggregator to determine the final output is to take an average of the model outputs. If the final output must be an integer, the aggregator may round the output to the nearest integer. In another embodiment, the aggregator may be a machine learning model that is trained to combine the outputs of the plurality of models. FIG. 3 illustrates another way to provide aggregation and will be discussed below.

Depending on the application, it may become necessary to delete or add a data element to an assigned subset. For example, the General Data Protection Regulation (GDPR) came into effect in May 2018 and sets guidelines for the management of personal data in the European Union. Anyone who maintains personal data records must comply with the GDPR guidelines. Therefore, there needs to be the ability to delete records from a machine learning system that uses personal data as training data to comply with the GDPR guidelines.

Generally, in machine learning system 10, when an assigned subset is changed, in addition to changing the database, the associated machine learning model that was trained using the assigned subset is prevented from being used during the inference phase of operation in the machine learning system. A new machine learning model is trained using the changed assigned subset. The machine learning system continues to perform inference operations without the removed machine learning model while the new machine learning model is being trained.

In the case where a data element must be removed from an assigned subset of training data, it may be necessary to not only remove the data element from memory but to remove any trace of the data element from the machine learning model that was trained with the data element. This is because an adversary may be able to recover personal information from a machine learning model by using a so-called inversion attack. In the illustrated embodiment, if a data element is to be deleted, the location of the data element, or record, in the database is determined. Determining which assigned subset includes the data element to be deleted is necessary to determine which of the plurality of machine learning models is affected. The partitioning method that was used to create the assigned subsets may be used to determine which model uses the data element to be deleted. The data element is deleted from the assigned subset thus creating a modified subset. Also, the model itself, that used the assigned subset, is deleted from the machine learning system. A new machine learning model is then trained using the modified subset. The machine learning system may continue to be used for inference computations while the model is being trained with the modified data subset. When the new model is trained, it can be reintegrated into the machine learning system and used during the inference phase operations.

When a data element is removed from the database, the machine learning model associated with the removed data element is completely removed such there is no information related to the removed data element remains in the database. Note that if the assigned subsets overlap, in may be necessary to remove two or more of the plurality of machine learning models. The ability to completely remove a data element can be important when, for example, the data element is a confidential record including personal information or sensitive corporate information.

In addition to removing data from a machine learning system, it may also be necessary to update a machine learning model with additional or new data elements from time-to-time. Adding a new data element to the system is similar to the procedure for deleting a data element. When a new data element is to be added, the new data element is assigned to one of the subsets of training data for a model. The associated model is located, removed from the system, and is then retrained using the updated training data subset. After the model is retrained, it can be used for inference or prediction operations of machine learning system 10.

Figure 2:
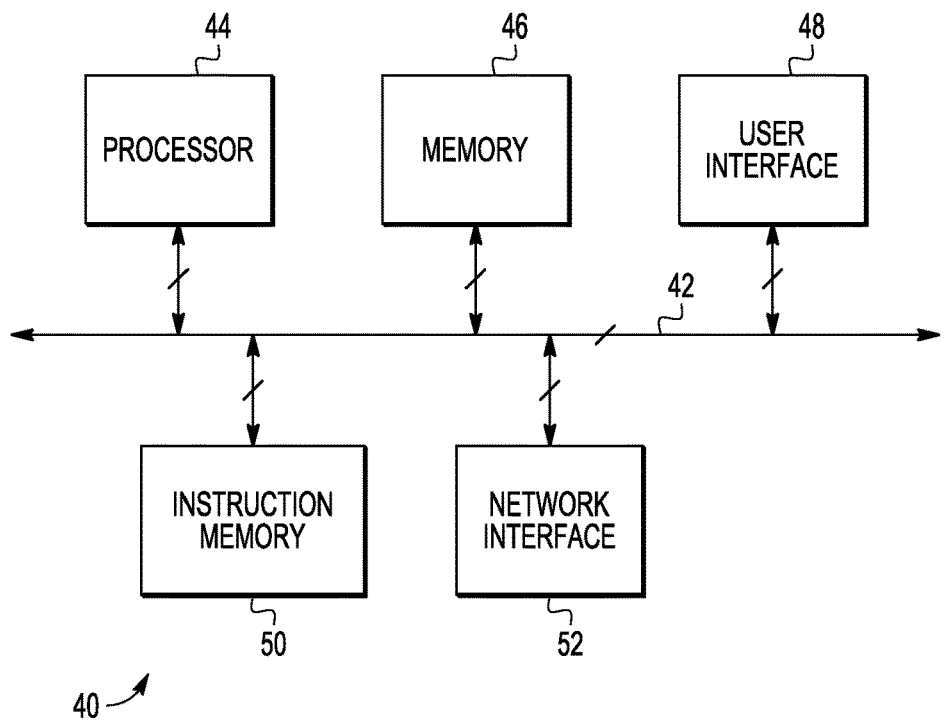
FIG. 2 illustrates a data processing system used to implement the machine learning system of FIG. 1 in accordance with an embodiment.

FIG. 2 illustrates data processing system 40 as one implementation of machine learning system 10 of FIG. 1. Data processing system 40 may be implemented on one or more integrated circuits and may be implemented in hardware, software, or a combination of hardware and software. Data processing system 40 includes bus 42. Connected to bus 42 is processor 44, memory 46, user interface 48, instruction memory 50, and network interface 52. Processor 44 may be any hardware device capable of executing instructions stored in memory 46 or instruction memory 50. Processor 44 may be, for example, a microprocessor, field programmable gate array (FPGA), application-specific integrated circuit (ASIC), or similar device. Processor 44 may include multiple processing cores. Processor 44 may be implemented in a secure hardware element and may be tamper resistant.

Memory 46 may be any kind of memory, such as for example, L1, L2, or L3 cache or system memory. Memory 46 may include volatile memory such as static random-access memory (SRAM) or dynamic RAM (DRAM), or may include non-volatile memory such as flash memory, read only memory (ROM), or other volatile or non-volatile memory. Also, memory 46 may be in a secure hardware element.

User interface 48 may be connected to one or more devices for enabling communication with a user such as an administrator. For example, user interface 48 may be enabled for coupling to a display, a mouse, a keyboard, or other input/output device. Network interface 52 may include one or more devices for enabling communication with other hardware devices. For example, network interface 52 may include, or be coupled to, a network interface card (NIC) configured to communicate according to the Ethernet protocol. Also, network interface 52 may implement a TCP/IP stack for communication according to the TCP/IP protocols. Various other hardware or configurations for communicating are available.

Instruction memory 50 may include one or more machine-readable storage media for storing instructions for execution by processor 44. In other embodiments, memory 50 may also store data upon which processor 44 may operate. Memories 46 and 50 may store, for example, a machine learning model in accordance with the embodiments described herein. Also, memories 46 and 50 may store training data for the machine learning model, as well as encryption, decryption, or verification applications. Memories 46 and 50 may be in the secure hardware element and may be tamper resistant.

FIG. 3 illustrates another embodiment of an aggregator of the machine learning system of FIG. 1. Aggregator 34' includes a plurality of aggregators represented by aggregators 58, 60, and 62. The aggregators each provide a different type of aggregation function. An input of each of the plurality of aggregators is connected to aggregator selector 56. Aggregator selector 56 selects one or aggregators 58, 60, and 62 as determined by machine learning system 10 or by a user of the system. The choice of which aggregator to select may be determined by user preference or some other criteria.

Figure 4:
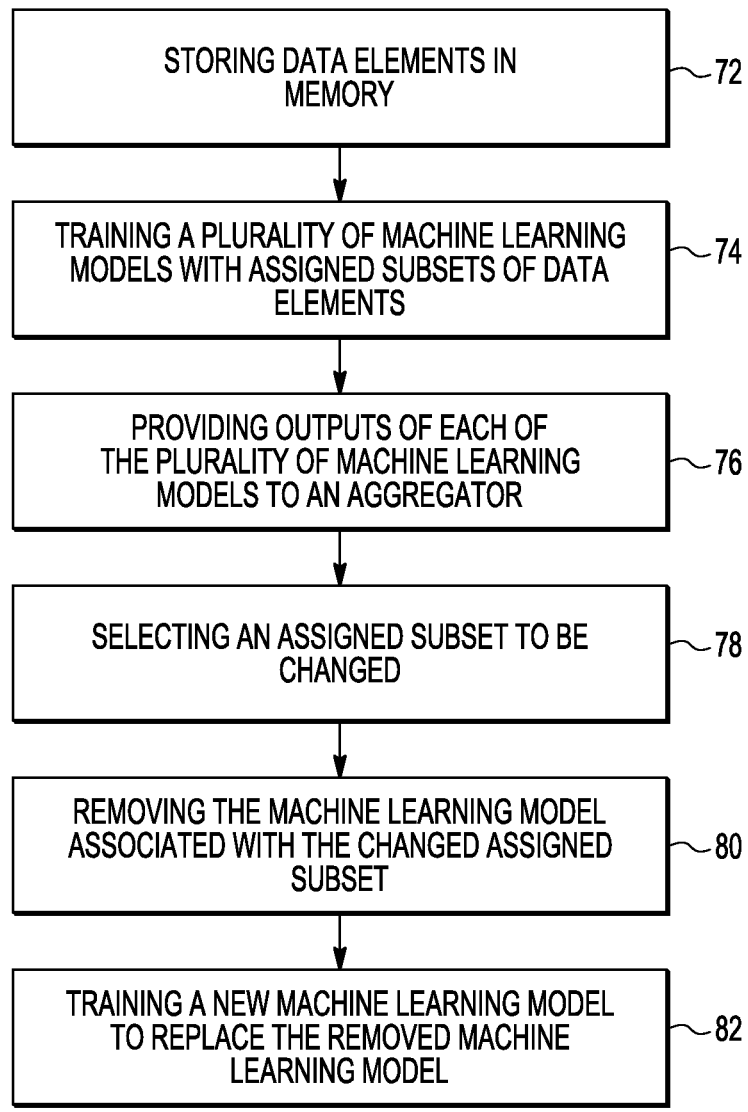
FIG. 4 illustrates a flowchart of a method for changing a record in the machine learning system of FIG. 1.

FIG. 4 illustrates a flow chart of method 70 for managing the machine learning system of FIG. 1. Specifically, method 70 provides steps for changing a record in machine learning system 10 of FIG. 1. Method 70 begins at step 72. At step 72, the training data elements are stored in a database and organized as a plurality of subsets, where each of the subsets is assigned to one of the plurality of machine learning models. The two or more of the subsets may overlap so that a data element may be in more than one subset. At step 74, the plurality of models is trained on the training data in a training operating phase. Each of the plurality of models is trained with its assigned subset of training data. At step 76, the outputs of each of the plurality of models is provided to an aggregator, such as aggregator 34 or aggregator 34'. At step 78, it is determined that a record needs to be deleted or added to a subset of training data. If a record is to be deleted, the record is removed from the subset of data elements assigned to the affected model. Alternately, a record may need to be exchanged for an updated record, which would require both the deleting and adding of records to the assigned subset. At step 80, the affected model is determined and removed from being used during the execution phase of operation. At step 82, the affected model is retrained using the modified subset of data elements and placed back into inference operation in machine learning system 10.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, NVM, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
providing a database for storing a plurality of data elements, wherein each data element of the plurality of data elements is assigned a unique identifier (ID);
providing a plurality of data partitions for providing assigned subsets of the plurality of data elements to inputs of a plurality of machine learning models, wherein each partition includes an assigned subset of the plurality of data elements for a corresponding one machine learning model of the plurality of machine learning models, wherein each assigned subset comprises a plurality of the unique IDs, and wherein each assigned subset comprises a different collection of the plurality of unique IDs;
training the plurality of machine learning models, each of the machine learning models being trained using the assigned subsets of the plurality of data elements;
coupling outputs of the plurality of machine learning models to an aggregator, wherein the aggregator is for determining a final output during an inference operation of the plurality of machine learning models;
selecting an assigned subset to be changed;
changing the selected assigned subset by removing a data element from the selected assigned subset or by adding a new data element to the selected subset;
removing the machine learning model associated with the changed assigned subset;
training a new machine learning model to replace the removed machine learning model using the changed assigned subset; and
using the plurality of machine learning models during the inference operation without the removed machine learning model while the new machine learning model is being trained.

2. The method of claim 1, wherein each machine learning model of the plurality of machine learning models uses a different machine learning algorithm.

3. The method of claim 1, wherein each machine learning model of the plurality of machine learning models uses the same machine learning algorithm but with different parameters.

4. The method of claim 1, wherein the assigned subsets of the plurality of records overlap with each other so that records in the overlapping portions are input to more than one of the plurality of machine learning models.

5. The method of claim 1, wherein the aggregator determines the final output by choosing a most commonly provided output from the plurality of machine learning models.

6. The method of claim 1, wherein selecting an assigned subset to be changed further comprises selecting one of the plurality of data elements to be removed from the assigned subset.

7. The method of claim 1, wherein the plurality of data elements comprises a plurality of confidential records.

8. The method of claim 1, wherein the aggregator is a plurality of selectable aggregators, each of the plurality of selectable aggregators being different from the other selectable aggregators.

9. A method comprising:
providing a database for storing a plurality of data elements, wherein each data element of the plurality of data elements is assigned a unique identifier (ID);
providing a plurality of data partitions for providing assigned subsets of the plurality of data elements to inputs of a plurality of machine learning models, wherein each partition includes an assigned subset of the plurality of data elements for a corresponding one machine learning model of the plurality of machine learning models, wherein each assigned subset comprises a plurality of the unique IDs, and wherein each assigned subset comprises a different collection of the plurality of unique IDs;
training the plurality of machine learning models, each of the machine learning models being trained using assigned subsets of the plurality of data elements;
coupling outputs of the trained plurality of machine learning models to an aggregator, wherein the aggregator is for determining a final output during an inference operation of the plurality of machine learning models;
selecting a data element of the plurality of data elements to be removed;
determining the assigned subset to which the selected data element belongs;
removing the selected data element from the assigned subset producing a changed assigned subset;
removing the machine learning model associated with the assigned subset that included the removed data element;
training a new machine learning model to replace the removed machine learning model using the changed assigned subset; and
using the plurality of machine learning models during the inference operation without the removed machine learning model while the new machine learning model is being trained.

10. The method of claim 9, wherein each machine learning model of the plurality of machine learning models uses a different machine learning algorithm.

11. The method of claim 9, wherein each machine learning model of the plurality of machine learning models uses the same machine learning algorithm but with different parameters.

12. The method of claim 9, wherein the assigned subsets of the plurality of records overlap with each other so that records in the overlapping portions are input to more than one of the plurality of machine learning models.

13. The method of claim 9, wherein the aggregator determines the final output by choosing a most commonly provided output from the plurality of machine learning models.

14. The method of claim 9, wherein selecting an assigned subset to be changed further comprises selecting one of the plurality of data elements to be removed from the assigned subset.

15. The method of claim 9, wherein the plurality of data elements comprises a plurality of confidential records.

16. The method of claim 9, wherein the aggregator is a plurality of selectable aggregators, each of the plurality of selectable aggregators being different from the other selectable aggregators.

17. A method comprising:
providing a database for storing a plurality of data elements, wherein each data element of the plurality of data elements is assigned a unique identifier (ID);
providing a plurality of data partitions for providing assigned subsets of the plurality of data elements to inputs of a plurality of machine learning models, wherein each partition includes an assigned subset of the plurality of data elements for a corresponding one machine learning model of the plurality of machine learning models, wherein each assigned subset comprises a plurality of the unique IDs, and wherein each assigned subset comprises a different collection of the plurality of unique IDs;
assigning the plurality of data elements to subsets of data elements;
training the plurality of machine learning models, each of the machine learning models being trained using one of the assigned subsets to produce a trained plurality of machine learning models;
coupling outputs of the trained plurality of machine learning models to an aggregator, wherein the aggregator is for determining a final output during an inference operation of the plurality of machine learning models;
determining that a data element of the plurality of data elements must be deleted;
determining the assigned subset to which the selected data element belongs;
determining the machine learning model that was trained by the assigned subset to which the selected data element belongs;
removing the selected data element from the assigned subset producing a changed assigned subset;
removing the machine learning model that was trained with the assigned subset so that the removed machine learning model no longer provides an output during the inference operation;
training a new machine learning model to replace the removed machine learning model using the changed assigned subset; and
using the plurality of machine learning models during the inference operation without the removed machine learning model while the new machine learning model is being trained.

18. The method of claim 17, wherein each machine learning model of the plurality of machine learning models uses a different machine learning algorithm.

19. The method of claim 17, wherein each machine learning model of the plurality of machine learning models uses the same machine learning algorithm but with different parameters.

20. The method of claim 17, wherein the assigned subsets of the plurality of records overlap with each other so that records in the overlapping portions are input to more than one of the plurality of machine learning models.

* * * * *